Aug. 7, 1962

O. KONRAD 3,048,116

MOTOR PUMP UNIT

Filed April 6, 1960

*INVENTOR:*
OTTO KONRAD
BY
Marshall, Johnston, Cook & Root

ATT'YS

United States Patent Office 3,048,116
Patented Aug. 7, 1962

3,048,116
MOTOR PUMP UNIT
Otto Konrad, Schriesheim an der Bergstrasse, Germany, assignor to Badische Anilin- & Soda-Fabrik Aktiengesellschaft, Ludwigshafen (Rhine), Germany
Filed Apr. 6, 1960, Ser. No. 20,493
Claims priority, application Germany Apr. 7, 1959
3 Claims. (Cl. 103—87)

My invention relates generally to motor pumps driven by electric motors, and more particularly to devices of the said kind which are adapted to be mounted in completely sealed casings.

In such devices the fluid being pumped often is at an extremely high pressure in relation to atmospheric pressure. In addition to the high pressures involved in the pump, difficulties are encountered when the motor pump unit is to be installed in a completely sealed pumping system with substantially zero leakage allowance, especially when pumping corrosive, explosive or poisonous fluids. Often the pumps work at elevated temperatures, where any leakage would have an extremely dangerous effect.

There are many disadvantages to prior designs, especially when the fluid must be pumped against high pressure. Under such conditions, much difficulty has been experienced in sealing the pump from the motor and the surrounding atmosphere. Also, where the pump operates under a vacuum, it is again necessary to seal the pump both from the motor and from the atmosphere to prevent leakage into the pump.

In many prior designs the stator assembly of the motor has been isolated from the pumped fluid and the rotor by a thin-walled non-magnetic metal cylinder, preferably of stainless steel, which was sealed at both ends to the motor end plates. Normally, this thin-walled metal cylinder is not thick enough to withstand high pressure. On the other hand, a thick cylinder strong enough to withstand high pressure would reduce the magnetic field of the stator.

In order to work under high pressure using the thin-walled cylinder, it is therefore necessary to equalize the pressures on the two sides of the cylinder, for example by filling the stator assembly with oil and using an external balance chamber with piston or bellows, thus supporting the cylinder.

It has been proposed to reinforce the thin-walled cylinder at the two ends thereof. However, the external pressure exerted on the said cylinder cannot in this way be increased.

Furthermore, there are designs in which the pumped liquid serves as a cooling medium for the motor laminations. This is not possible with hot or corrosive liquids. Moreover, the liquid should then have a good lubricating action. In vertical pumps the heat of the motor is difficult to withdraw when around the laminations there are only gases under high pressure.

In my design I have provided a hermetically sealed motor pump unit capable of being removed together with the motor without any difficulty, for maintenance or repair. My motor pump is provided with novel means for reducing axial movement caused by axial thrust.

Accordingly, it is the principal object of my invention to provide a sealed motor pump unit having improved means for equalizing the pressure of the oil and the pumped fluid and thus allowing the use of a thin-walled cylinder for separating the stator and rotor.

Another object of my invention is to provide a sealed motor pump unit of simplified construction having improved means to move as a single integral unit within the pump housing.

A further object is to provide a motor pump unit with substantially zero leakage.

Another object of my invention is to provide a sealed motor pump unit having novel means to support the shaft bearings, which means further serve in a piston-type assembly to equalize the pressure in the oil.

Further objects and advantages of the invention will become more apparent from the following detailed description of a preferred embodiment thereof, taken in connection with the accompanying drawings, in which.

Figure 1:
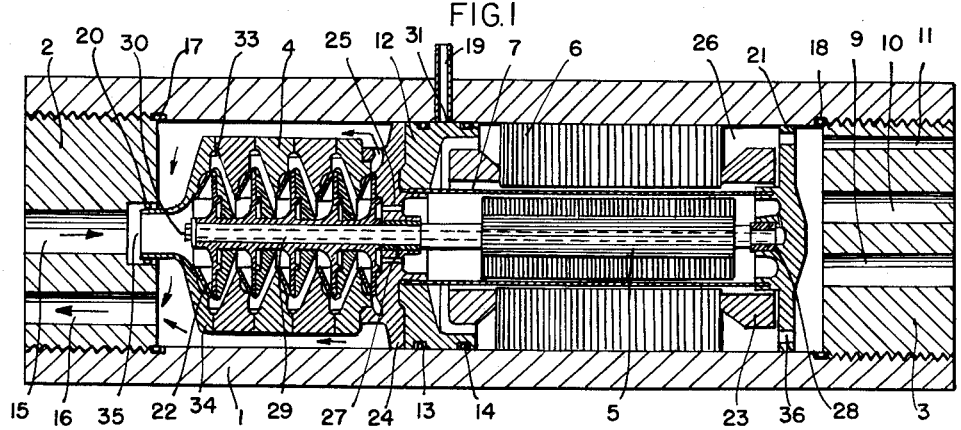
FIGURE 1 is a longitudinal sectional view of a sealed motor pump unit constructed according to my invention.
Figure 3:
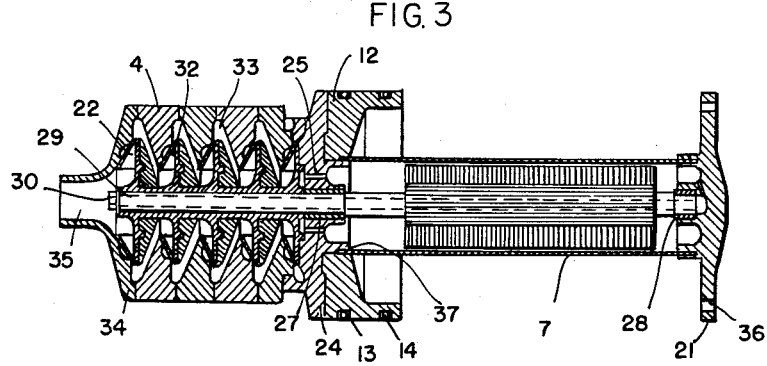
FIGURE 3 is a longitudinal sectional view of the piston system.
Figure 4:
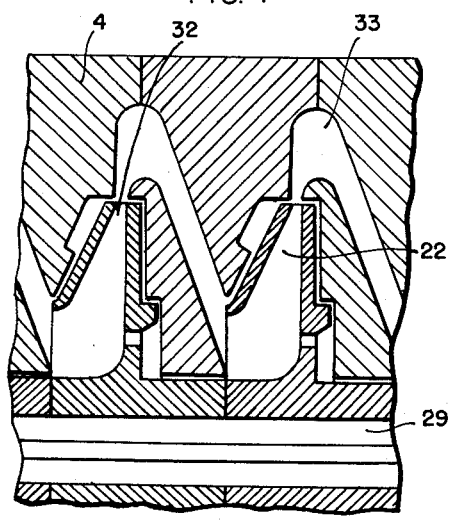
FIGURE 4 is an enlarged cut away view of FIGURE 3 showing the construction of the impeller and stator.
Figure 2:
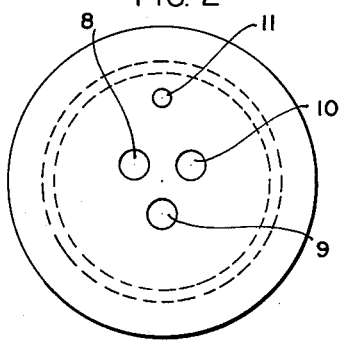
FIGURE 2 is a top view of the end plate of the motor pump unit showing the three openings for the terminal studs connecting the stator windings with the power cables.

The hermetically sealed motor pump unit shown in FIGURES 1 and 2 is designed for use in pumping systems involving the pumping of dangerous media.

Referring now particularly to FIGURE 1, which illustrates a preferred embodiment of my invention, there is shown a motor pump unit including, generally, a motor unit having a stator and rotor combined with a pump unit in a hermetically sealed housing, pump and rotor being connected to non-magnetic partition means which encloses the rotor and acts as a fluid seal between the rotor and stator. The pump is further connected to a piston means located between the pump and the partition means and movable within the housing in the longitudinal direction of the rotor axis.

The piston means is slidably sealed in the inner surface of the housing, which acts as a cylinder therefor, in such a way that the piston forms a fluid seal between the pump and the stator. Since the rotor of the motor is in fluid connection with the pump, the piston means together with the partition means prevent any pumped fluid entering the stator.

By the terms "rotor," "stator" and "pump" as employed herein I mean not only the mechanical parts but also the space or chamber which immediately surrounds or encloses each of these parts.

The motor pump unit has a solid tubular housing or frame 1 with annular end plates 2 and 3 attached to the upper and lower ends of the motor housing by any suitable means, e.g. by nuts and studs. Inserted in the motor housing is a stator incorporating circular or annular laminations 6, preferably of a magnetic material, e.g. magnetic steel. Suitable stator windings are placed in inwardly opening slots (not shown in FIGURE 1) in the laminations 6 and have end turns 23 extending therefrom at either end. The rotor of my motor is generally comprised of two pieces; a generally cylindrical rotor core 5, preferably made of a corrosion-resistant material, such as stainless steel, and a shaft 29. This shaft is composed of several longitudinal sections having different diameters and is attached to the rotor core 5 by any suitable means, such as welding or soldering. A suitable squirrel-cage type winding, including longitudinally extending conductors, is positioned in suitable inwardly projecting slots on the outer periphery of the rotor core 5. The shaft 29 has two sleeve bearings 27 and 28. The sleeve bearing 27 between pump and rotor is mounted in a plate 24 serving as basic disc of the pump. Connected with the basic disc 24 is a piston plate 12. The bearing 28 is mounted in a movable plate 21.

In order to isolate the rotor core 5 and the stator laminations 6, there is inserted a thin-walled cylinder 7 extending in axial direction from the piston 12 to the movable plate 21. The thin-walled cylinder 7 is thus clamped or firmly held at one end between the inner surface of a circular opening of the piston 12 and the outer surface of an annular sleeve 37 extending toward the motor from the basic disc 24, and at the opposite end in an annular slot in the movable plate 21. Made of a non-magnetic material, such as stainless steel, the thin-walled cylinder 7 is positioned between the outside diameter of the rotor 5 and the inside diameter of the stator laminations 6. As described above, the cylinder 7 connects the piston 12 to the movable plate 21, so that the piston and the plate can move as a single unit. The movable plate 21 has two openings 36, which serve to connect the two enclosed chambers on either side thereof. The thin-walled cylinder in this embodiment of my invention can safely be used under varying pump pressures. The function of this combination will be described in greater detail hereinafter.

Basic disc 24 for the pump unit and piston 12 are securely bolted together. The pump unit disclosed in this embodiment of the invention is of conventional type having five hollow impellers 22 mounted on the shaft 29 of the rotor by means of a nut 30. These impellers on the shaft are thus rotated by the motor to pump fluid into the pump casing 4. The impellers draw the fluid in through the suction inlet 15 of the end plate 2 and impel the fluid radially outward through discharge openings 32 into annular areas 33 of the pump casing 4 which surrounds the impeller. The fluid finally flows out of the housing through discharge outlet 16. The end of the pump casing 34 where fluid enters is provided with a cylindrical extension 35 which may freely move in a recess of the end plate 2. The discharge pressure of the pump impellers is prohibited from flowing back through the small opening between end plate 2 and extension 35 to the suction inlet 15 by means of the O-ring 20 which seals the extension 35 against the end plate. This O-ring is made of rubber or any similar resilient material and is sufficiently flexible to permit the longitudinal movement of the extension 35, such movement being very slight.

I have provided a new and unique piston means for substantially reducing the difference between the pressure in the inner portion or chamber of the motor, i.e., the rotor, caused by the pressure of the fluid entering the rotor from the pump through openings 25 in the basic disc 24 and the pressure in the outer portion or chamber of the motor, i.e., the stator. The said piston means includes a movable piston plate 21, that is connected with the pump and the basic disc 24 by any suitable means such as bolts and nuts and with the thin-walled cylinder 7 previously discussed. The fluid in the pump may freely flow into the rotor through openings 25 in basic disc 24, these openings being so located that the fluid also flows through the circular opening of the piston 12. The axial thrust, generated by the pressure of the fluid, which presses against the piston 12, produces a longitudinal movement of the whole system, the said system consisting of pump casing 4 with impellers 22 and shaft 29, basic disc 24, piston 12, thin-walled cylinder 7 between piston 12 and movable plate 21, rotor 5 and movable plate 21. By this movement, the inner chamber 26 formed by movable plate 21, end plate 3, pump housing 1, thin-walled cylinder 7 and piston 12, which is filled with oil, is placed under pressure. It will be apparent that piston 12 works like the piston in a pump, housing 1 serving as the cylinder for the said pump.

The pressure of the oil in chamber 26 in theory increases until it reaches the same amount as the pressure of the liquid pumped. The proposed arrangement of the movable and integral motor pump system within the casing, which works on the principle of a piston in a pump, is so effective that for a given change of pressure in the pump the pressure in the oil and in the pumped fluid remain identical. For this reason, the thin-walled cylinder has to withstand the same pressure on either side. It is thus possible to choose a partition means of stainless steel which has sufficiently thin walls to safeguard good electrical efficiency for the motor unit.

The piston 12 preferably has two O-rings 13 and 14 to seal the pumped fluid from the oil. If one of these rings should fail, either liquid or oil will flow through the opening or line 19 into the motor housing and no mixing of fluid and oil will occur.

Line 19 can be connected to a vacuum pump in order to ensure that any escaping fluid will flow outwardly to a lower pressure. A vent 31 positioned between the two O-rings 13 and 14 will prevent damage to the motor pump unit in the event of failure of one of the O-rings.

A vent 11 is provided in the end plate 3 for venting any air entrapped in the space 26 and the air spaces connected therewith and these spaces can thus be completely filled with oil.

The stator end turns 23 are connected to tapered terminal parts which pass through three openings 8, 9 and 10 in motor end plate 3, each opening in end plate 3 having a tapered bushing. The tapered bushings are sealed in the openings by means of O-rings, preferably of a resilient material. The two end plates are sealed against the fluid pumped by the motor and against the oil in the inner chamber by means of seals 17 and 18, respectively.

I have provided a motor pump unit with substantially no leakage allowance, avoiding an external balance chamber and labyrinth seals. The unit is designed to operate with the rotor submerged in the fluid pumped, the stator windings being hermetically enclosed to isolate them from the pumped liquid. The combination of piston means with the motor pump unit provides a much improved and considerably safer operation.

I claim:

1. In a motor pump unit hermetically sealed in a housing and comprising a motor having a rotor and a stator, and a pump embodying a frame and an impeller connected with the rotor, wherein the rotor of the motor is in fluid connection with the pump and said rotor is separated from the stator of said motor by an enclosing non-magnetic partition forming a fluid seal between said rotor and stator, the improvement which comprises the provision of piston means connected between said partition and said pump, whereby the pump may deliver work fluid under pressure within the partition and within the housing on the partition remote side of the piston means, said piston means being movable within the housing together with said rotor, partition and pump in the axial direction of the rotor and impeller, said housing serving to retain stator submerging fluid therein, on the rotor remote side of the partition and on the pump remote side of the piston means, said piston means being slidably sealed to the inner surface of said housing which acts as the cylinder for said piston means, whereby said piston means forms a fluid seal between said pump and said stator, so that pressure may be developed in said stator submerging fluid substantially equal to the pressure at which work fluid is delivered by the pump upon the partition remote side of said piston means.

2. A hermetically sealed motor pump unit with piston means as claimed in claim 1 comprising means to establish a substantially new type of leakage allowance, the piston means being provided with spaced apart circumferential O-rings sealing it shiftably upon the inner surface of the housing, an opening being provided in the housing in position between the said O-rings to prevent any fluid mixing with the stator submerging fluid on the other side thereof, in the event of failure of either of said O-rings, said opening being adapted for connection with pump means to draw any leaked fluid out of the housing.

3. A hermetically sealed motor pump unit as claimed in claim 1 wherein the housing has an end plate formed with a suction inlet opening, and the frame of the pump has a tubular extension axially movable in said opening, and means to establish a seal between the outer surface of the tubular extension of the pump frame and the housing at said suction inlet opening, to provide a safe isolation of the fluid discharged by the pump at high pressure and the fluid as received at the suction inlet opening.

References Cited in the file of this patent

UNITED STATES PATENTS

| | | |
|---|---|---|
| 1,105,808 | MacNeill | Aug. 4, 1914 |
| 2,258,064 | Myers | Oct. 7, 1941 |
| 2,763,214 | White | Sept. 18, 1956 |